MULTIPLYING MEANS FOR TABULATING MACHINES

INVENTORS
ARTHUR NELSON
WILLIAM R. SCHWOLOW
BY
ATTORNEYS

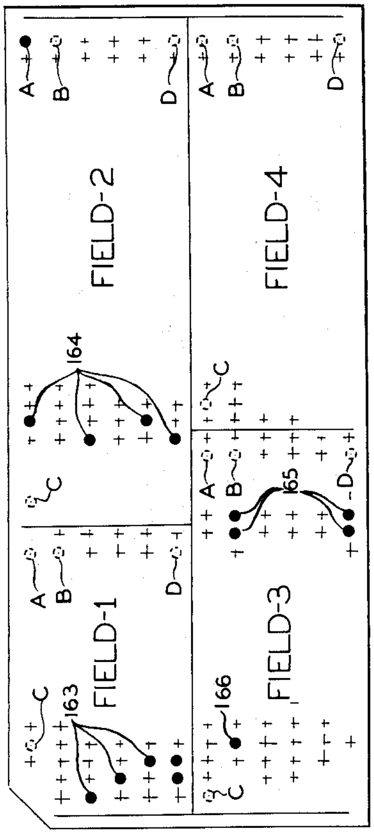
FIG. 2
| DESIGNATION CODE | NUMBER OF UNITS | UNIT PRICE | CONTROL ENTRY | TOTALIZER RESULT | CARD FIELD | MACHINE CYCLE |
|---|---|---|---|---|---|---|
| | | | | +2.5 | | |
| | | | | | | |
| 368 | 4 | | 4C | -1.5 | 1 AND 2 | 1 |
| 368 | | 22 | 1 | -0.5 | 1 AND 3 | 2 |
| 368 | | 22 | 1 | +0.5* | 1 AND 3 | 3 |
| 368 | | 22 | 1 | +1.5 | 1 AND 3 | 4 |
| 368 | | 22 | 1 | +2.5 | 1 AND 3 | 5 |
| | | 88T | | | | 6 |
| | | | | +2.5 | | 7 |
FIG. 4
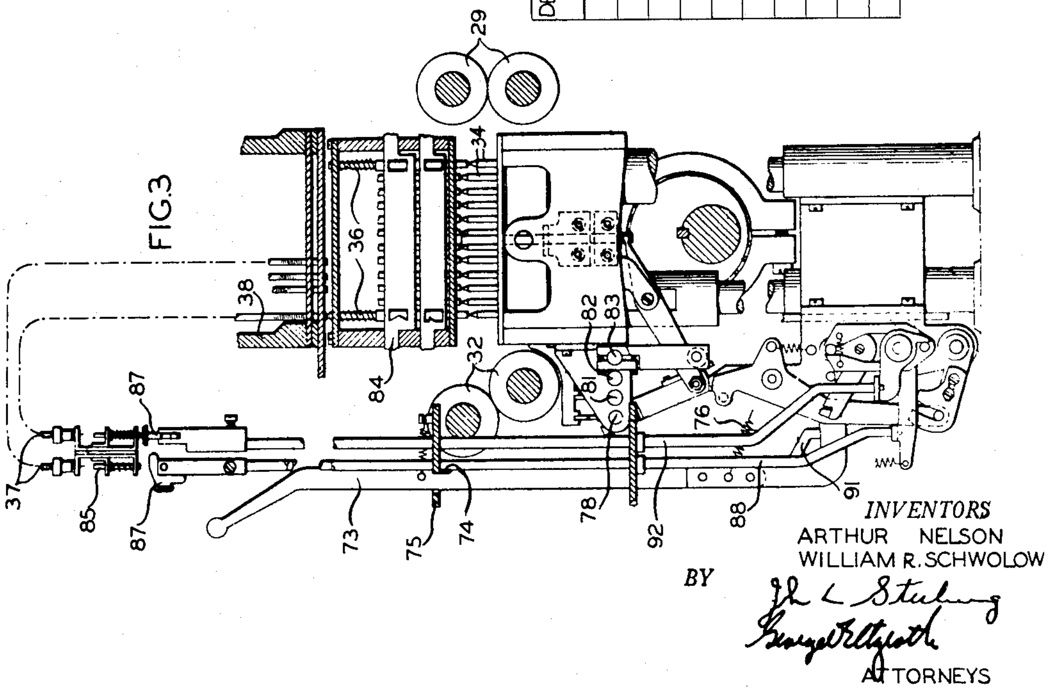
FIG. 3
INVENTORS
ARTHUR NELSON
WILLIAM R. SCHWOLOW
BY [signatures]
ATTORNEYS

MULTIPLYING MEANS FOR TABULATING MACHINES

Filed Aug. 21, 1952 4 Sheets-Sheet 3

INVENTORS
ARTHUR NELSON
WILLIAM R. SCHWOLOW

BY

ATTORNEYS

April 24, 1956 A. NELSON ET AL 2,743,055

MULTIPLYING MEANS FOR TABULATING MACHINES

Filed Aug. 21, 1952 4 Sheets-Sheet 4

INVENTORS
ARTHUR NELSON
WILLIAM R. SCHWOLOW

BY

ATTORNEYS

United States Patent Office 2,743,055

Patented Apr. 24, 1956

2,743,055

MULTIPLYING MEANS FOR TABULATING MACHINES

Arthur Nelson and William R. Schwolow, Norwalk, Conn., assignors, by mesne assignments, to Sperry Rand Corporation, New York, N. Y., a corporation of Delaware Application August 21, 1952, Serial No. 305,652

17 Claims. (Cl. 235—61.6)

This invention relates to record controlled tabulating machines, and more particularly to a mechanism that, in conjunction with existing devices, will permit the tabulating machine to perform multiplication by successive addition of values punched in a record card. The invention consists chiefly of improvements on or additions to mechanism of the sort disclosed in the patent to Harold P. Mixer, 2,516,013, dated July 8, 1950, and is shown as applied to a machine of the type disclosed in the patent to John Mueller, 2,381,361, dated August 7, 1945.

Mechanism of the sort involved, herein called multiplying means, functions to enable a card-controlled tabulating machine to retain a record card for a proper number of machine cycles to complete a desired multiplication operation.

It has been found desirable to permit a tabulating machine to perform multiplication under card control, as well as its normal functions of addition and subtraction under card control. Furthermore, it has been found desirable to perform multiplication by means of information sensed in either one of two areas or fields of the same record card, each of said areas being sensed on successive machine cycles. Further, it has been found desirable to interrupt normal sequencing action of selective sensing mechanism to permit completion of a desired multiplication. Satisfaction of the aforementioned desires by means described hereinafter permits elimination of an additional machine required heretofore for this purpose.

Therefore, one object of the invention is to enable a tabulating machine to perform multiplication under card control.

Another object of the invention is to interrupt the normal sequencing action of the selective sensing mechanism in order to complete a desired multiplication operation.

Another object of the invention is to enable a tabulating machine to perform multiplication by information sensed in either one of two areas or fields of the same record card.

Another object of the invention is to enable a tabulating machine to perform multiplication by information sensed in one area or field on each of two record cards.

Other objects and structural details of the invention will be apparent from the following description when read in connection with the accompanying drawing, wherein:

Fig. 2 is a diagrammatic view of a record card arbitrarily divided into a plurality of fields and having specific data perforations punched therein, with alternative control hole locations shown in dotted lines;

Fig. 3 is a fragmentary sectional view of the selective sensing mechanism showing relative location of various control members;

Fig. 4 is a diagrammatic view illustrating the transfer of data to a ledger sheet for a multiplication operation when printing on all cycles;

Figure 1:
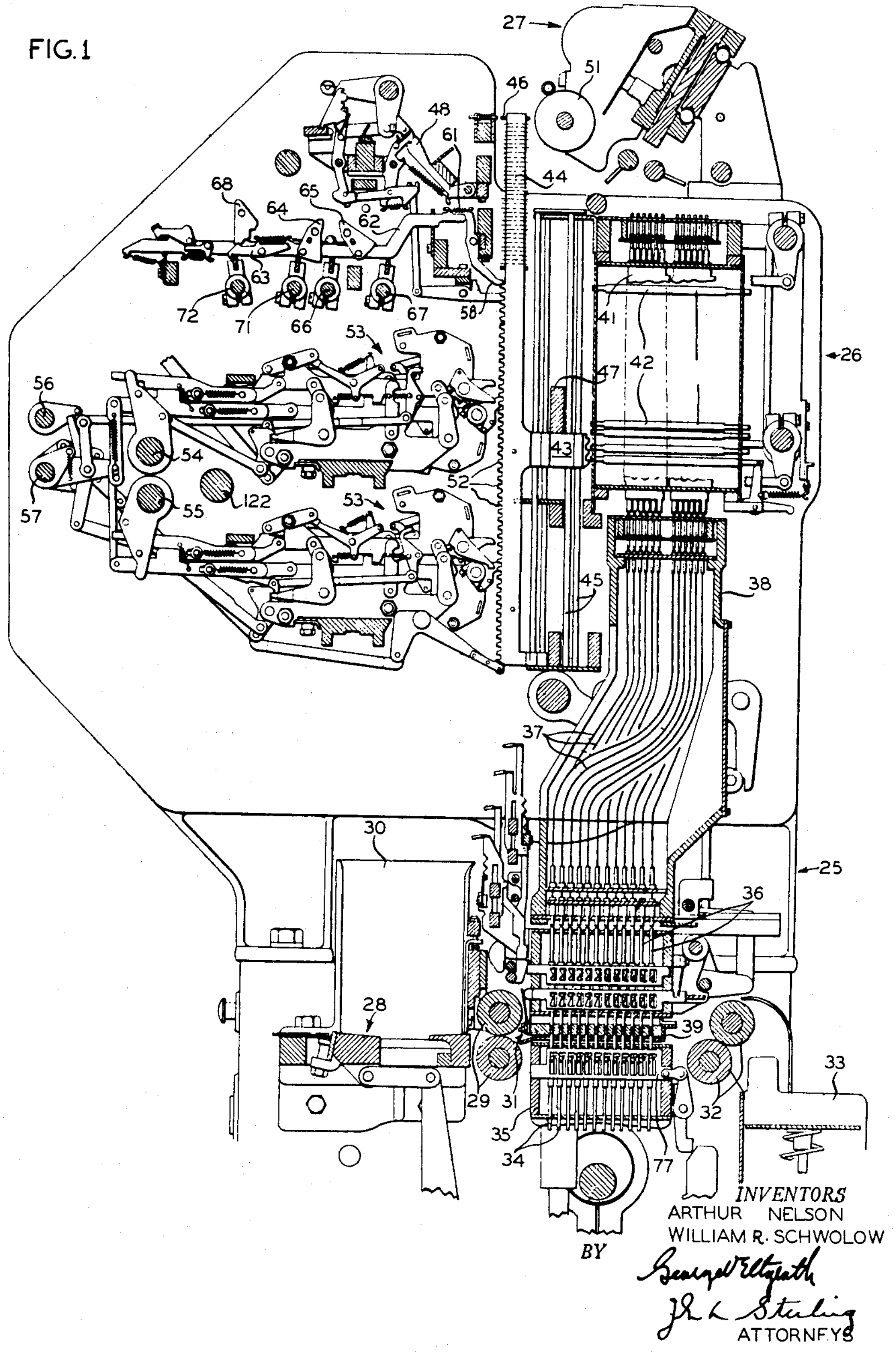
Fig. 1 is a sectional view in side elevation through a portion of a tabulator with many parts omitted or broken away.

The tabulating machine to which the invention is shown applied will be described only in so far as is necessary to an understanding of the invention, reference being made to the above-cited Patents 2,516,013 and 2,381,361 for a more complete description thereof. Said machine is made in two principal parts, a base section 25 and a head section 26, the latter supporting a paper carriage 27 (Fig. 1).

Punched cards are fed by a picker 28 and feed rolls 29 from a hopper 30 into a sensing chamber 31 and thence by feed rolls 32 into a receptacle 33. The cards are sensed by sensing pins 34 in a reciprocating pin box 35, and such of said pins as find holes, push upward set pins 36, whose motion is communicated by Bowden wires 37 in a wiring unit translator 38 to code or permutation bars 41 which control a set of stops 42. In each denomination, the stops 42 arrest a bracket 43 on a differential type bar 44, which slides on guide rods 45 and carries a set of numeric and alphabetic type 46. Said type bars are pushed up by springs and are restored by a restoring bar 47. Hammers 48 drive the type against the paper on a ledger sheet on the platen 51, mounted in the carriage 27.

Below the type 46 each of the differential type bars 44 has its front edge cut into rack teeth 52 for operating totalizers designated generally 53. The totalizers are arranged in front of the rack bars in a plurality of tiers, an upper and a lower tier being shown in the present instance. Each of the totalizers shown is capable of addition and subtraction, and of yielding true negative balances, the fugitive one being inserted by transferring from the highest wheel to the lowest.

It will be understood that at any desired position across the machine two totalizers may be mounted one above the other, as shown in Fig. 1, said totalizers being actuated by the same racks 52, and this arrangement may be used in any one of the variety of ways familiar to those skilled in the art. In the present machine the mechanism is arranged so that normally all numbers recorded in the zone appropriate to a pair of these totalizers, will be either added or subtracted on both totalizers alike. That is, each pair of totalizers will be set automatically for addition or for subtraction, according to information sensed from the record card, after which the accumulators are moved into engagement with their associated racks 52. The upper totalizers are moved into engagement by clockwise rotation of the shaft 54 (corresponding to shaft 321 of Patent 2,381,361), while the lower totalizers are moved into engagement by counterclockwise rotation of the shaft 55 (corresponding to shaft 333 of Patent 2,381,361).

It will be understood that during a total operation, the lower tier of totalizers will be moved into engagement at a proper time by counterclockwise rotation of the shaft 55. During a grand total operation, the upper tier of totalizers will be moved into engagement at a proper time by counterclockwise rotation of the shaft 54. On such total and grand total operations, each totalizer will be shifted automatically to its addition or subtraction position according to the appropriate sign of its contained amount. This operation is accomplished by clockwise rotation of the so-called "credit balance" shaft 56 (corresponding to the shaft 521 in Patent 2,381,361) at the beginning of the blank stroke for a total or a grand total operation. It will be understood that the rod 57 (corresponding to the rod 350 in Patent 2,381,361) serves as a stationary pivot point for certain members of the credit balance mechanism. Operation of this mechanism is fully is fully described in the referenced patent.

The "slam bail" mechanism of the machine consists essentially of a series of pawls 58 (Fig. 1) and mechanism for controlling them. There is one of these pawls for each type bar 44 and they cooperate with the rack teeth 52 in pawl and ratchet fashion so that when one of them is engaged as shown in Fig. 1, it will permit downward motion of the rack bar, but will not permit upward motion. Each of the pawls 58 has at its upper end a tension spring 61 connecting it with a control bar 62. Various ways are provided for moving this control bar 62 so as to provide various modes of operation and functions in the machine. On each control bar 62 there are pivoted three connectors 63, 64, and 65. The connectors 64 and 65 are each hand-settable to an active and an inactive position. When the connector 64 is set effective, it acts to engage the blade of a sheet 66 when said shaft is rocked counterclockwise. When the connector 65 is set effective, it acts to engage the blade of a shaft 67 when said shaft is rocked counterclockwise. A detent 68 may be set to one of three positions, viz., to cause connector 63 to engage the blade of a slam bail shaft 71, to cause connector 63 to engage the blade of a designation shaft 72, and to cause connector 63 to engage neither of said shafts. Parts of the slam bail mechanism mentioned herein are identical to their corresponding parts shown in Patent 2,381,361. Operation of this mechanism is fully described in the referenced patent.

In addition, the tabulating machine is adapted for the selective sensing of different zones in the same card, of different fields of the same zone and of different fields of different zones. It is deemed desirable first to define what is meant by "zone" and "field." A card containing ninety columns is one which has been divided lengthwise whereby forty-five columns of twelve perforation positions are divided into upper and lower columns of six perforation positions each. The upper forty-five columns constitute an upper zone and the lower forty-five columns constitute a lower zone. A field is made up of any desired number of columns.

For purposes of the present description it will be assumed that the record cards to be handled by the machine are divided up into four fields as shown in Fig. 2. It will be understood that the specific division of the card shown is used only to clarify the description, the actual division of a card being done by the individual users of the machine to suit their respective requirements.

In order to sense successively the different zones or fields of a card, the sensing pins 34 appropriate to said zones or fields are selectively locked up as the card is successively sensed. Mechanism to obtain this result will hereinafter be referred to as the "multi-stage" mechanism. To enable the multi-stage mechanism, a lever 73 is raised, see Fig. 3, so as to engage a notch 74 with a bracket 75. The mechanism is disabled by disengaging the notch from the bracket, whereupon a spring 76 serves to restore the lever 73 to its normal position.

Each column of sensing pins 34 is flanked on both sides by locking slides 77, see Fig. 1, one of said slides having locking teeth for the six pins of the upper column of a row, and the other slide having locking teeth for the six pins of the lower column. It will be assumed that those columns of sensing pins falling within fields 1, 2, 3, and 4 have their slides arranged to be operated by the rock shafts 78, 81, 82, and 83, respectively, see Fig. 3.

In the illustrated instance the designative data peculiar to a group of cards is punched in field 1 of each card of said group, which results in that said field is sensed during each cycle of the machine to prevent the designation pattern set up on the set pins 36 from being erased and thereby actuating the slides 84 to cause a total taking operation of the machine at an inappropriate time. It is desired to sense the data in fields 2, 3, and 4 during successive cycles of the machine instead of on every cycle. For purpose of description, the term "stage" will be employed hereinafter to indicate each period of machine operation during which a different group of sensing pins is effective.

As described in Patent 2,516,013, the rock shafts 78, 81, 82, and 83 are permitted to enable their associated lock slides on preselected machine cycles. As disclosed therein when four fields are employed, one of said fields, i. e. field 1, is sensed in each stage of operation. The construction is such that normally the machine is conditioned on first stage operation to sense, in addition to field 1, field 2, and locking slides associated with fields 3 and 4 are disabled. It will be assumed that the first stage shaft 78 controls the sensing of field 2 and the second stage shaft 81 controls the sensing of field 3. Further, it will be assumed for the present that it is desired to sense field 3 immediately following field 2. A control perforation A is punched in a desired position in field 2 and the set pin 36 for this position is wired to a related plunger 85.

When field 2 is sensed near the end of a cycle, the Bowden 37, connected to the related plunger 85, is actuated and, if an associated interponent 87 is set active, depresses a control 88. In this manner the machine is conditioned to sense field 3 on second stage operation and locking slides associated with fields 2 and 4 are disabled. The control rod 88 is restored during second stage operation.

For those instances where it is desired to sense field 4 immediately following field 3, a control perforation B is punched in a desired position in field 3 and set pin 36 for said position is wired to another of the plungers 85. The construction is such that when field 3 is sensed near the end of a cycle, the Bowden 37 connected to said other of the plungers is actuated, and, if the associated interponent 87 is set active, the control rod 91 is depressed. In this manner the machine is conditioned to sense field 4 on third stage operation and locking slides 77 associated with fields 2 and 3 are disabled. The rod 91 is restored during third stage operation.

The control rod 88 and control rod 91 correspond to the rod 113 and rod 113B, respectively, of Patent 2,516,013.

Upon completion of third stage operation, then, the machine is conditioned automatically to obtain first stage operation on the next card.

Whereas it has been described that the mechanism senses fields 2 and 3 or 2, 3, and 4 in the succession named, it can sense fields 2 and 4 or 2, 4, and 3 in those successions merely by punching the appropriate control hole in the second position mentioned to be in field 2 or in any desired position in field 4 and appropriately wiring said positions to the plunger 85. It is evident, therefore, that a large variety of different combinations of fields can be sensed successively if the cards are provided with the appropriate control holes. As described in Patent 2,516,013, the card feed mechanism is disabled and the card stop is maintained in the closed position so as to hold the card in the card chamber for the requisite number of cycles during multi-stage operation.

Normally, the machine is conditioned to sense field 2 only, and a control hole A or B must be provided in that field to condition the machine to sense field 3 or 4 and to prevent sensing of field 2. When it is desired to sense only field 3 or 4 of the cards, the first card to be sensed, usually a control card containing only control perforations, is punched with this control hole A or B in field 2. However, the remainder of the cards have the control hole in field 3 or 4, whichever is the only field that it is desired to sense, in order to maintain the machine in condition to sense that field. In like manner, said cards are provided with a control hole C to actuate a control rod 92 and prevent the card feed and card stop mechanism from being disabled as above described. The last card of the group which it is desired to sense in this manner would contain neither control hole A, B, or C and after it has been sensed the machine would return to normal and would be conditioned to sense field 2 of the next card.

The above description takes into account the sensing of field 2, 3, or 4 of each card, but it is evident that it is possible to sense field 2 of some cards, field 3 of other cards, and field 4 of still other cards; or all fields of some cards and any combination of fields of other cards merely by punching the control holes A, B, and C in the proper places, or not punching them as required. It is also possible to condition the tabulator to repeat print formation contained in a card by the proper use of said control holes. As shown in Figs. 5 through 10, the multiplying means consists of related members and mechanism disposed as described in the paragraphs immediately following and utilizing only two-stage operations by the multistage mechanism above mentioned.

Figures 8, 9, 10:
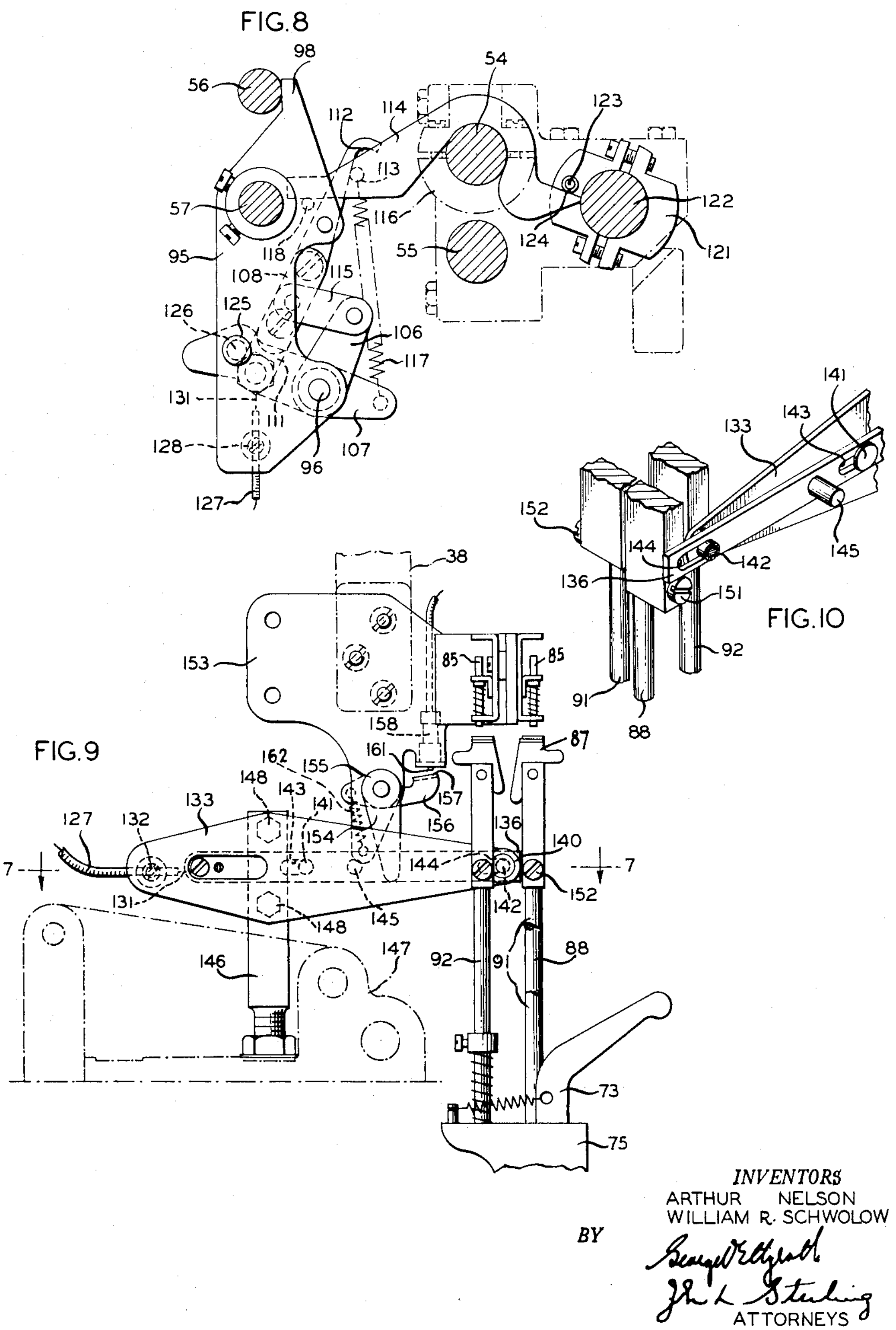
Fig. 8 is a vertical section on the line 8—8 of Fig. 5 showing a portion of the multiplication control mechanism in side elevation.
Fig. 9 is a fragmentary view in side elevation of the machine head section with many parts omitted or broken away, and showing the holding member retracted and with associated parts.
Fig. 10 is a view in perspective of the holding member in extended position.

A direct subtraction totalizer 93 hereinafter termed the control totalizer is selected at a convenient location from among the lower tier of totalizers normally used for taking group or sub totals, see Fig. 6. A plate 94 is secured at a suitable location adjacent to the control totalizer 93, on the pivot rod 57. (The pivot rod 57 corresponds to the rod 350 in Patent 2,381,361.) A plate 95, see Figs. 5 and 8, is secured to the pivot rod 57 at a distance from the plate 94 determined by the length of a shaft 96. The plate 94 has an ear 97 formed at its upper end which serves to position the plate by bearing against the shaft 56. The plate 95 has an ear 98 formed at its upper end which serves to position the plate by bearing against the shaft 56.

A modified link 101, hereinafter referred to as the "credit balance link" is utilized to adapt the control totalizer 93 for control of the multiplying mechanism.

An arm 102, fast on the shaft 96, incorporates a slot 103. Said arm 102 is positioned so that the slot 103 cooperates with a pin 104 at the juncture of a link 105 and the credit balance link 101 of the control totalizer 93. The construction is such that whenever said control totalizer contains a positive total, the arm 102 will be rocked clockwise and whenever it contains a negative total said arm will be rocked counterclockwise.

An arm 106 fast on the shaft 96 is adjacent to a rockable lever 107, loose on said shaft. Said rockable lever is movable to an active and to an inactive position.

A hook-like member having an arm 108 adjustably secured to a supporting arm 111 is pivotally mounted on the rockable lever 107. Said member is movable to an active and to an inactive position. The adjustable arm 108 has a hook-like portion comprising a shoulder 112 formed off therefrom and adapted for engagement with a pin 113 carried by a loose mounted lever 114 supported by shaft 54. One end of a link 115 is pivotally mounted on said adjustable arm 108, and the opposite end of said link is pivotally mounted on the arm 106. Construction is such that when the shaft 96 is rocked clockwise, said hook-like member is rocked to its active position, and vice versa.

Split collars 116 fast on the shaft 54 align the lever 114 on said shaft. Said lever is drawn counterclockwise by a spring 117 until arrested by a fixed post 118. A split hub 121 fast on a shaft 122 has mounted thereon a pin 123 having a roller 124. (Said shaft 122 corresponds to the head section upper main drive shaft 185 of Patent 2,381,361 and as therein described makes one revolution during each machine cycle.) The lever 114 will therefore be actuated once during each machine cycle. Construction is such that the hook-like member when active is engaged by the pin 113 of the lever 114 whenever said lever is actuated. Inactive position of said hook-like member permits idle motion of said lever.

A housing 125, attached to the plate 95, supports a manually-operated pin 126. By raising the rockable lever 107 manually and inserting said pin 126 through the plate 95, the multiplying means may be disabled manually.

One end of a Bowden wire housing 127 is mounted in a block 128 attached to the lower end of the plate 95. The corresponding end of the Bowden wire core 131 is suitably secured to the pivotal attachment of said hook-like member to said rockable lever 107.

Figures 5, 6, 7:
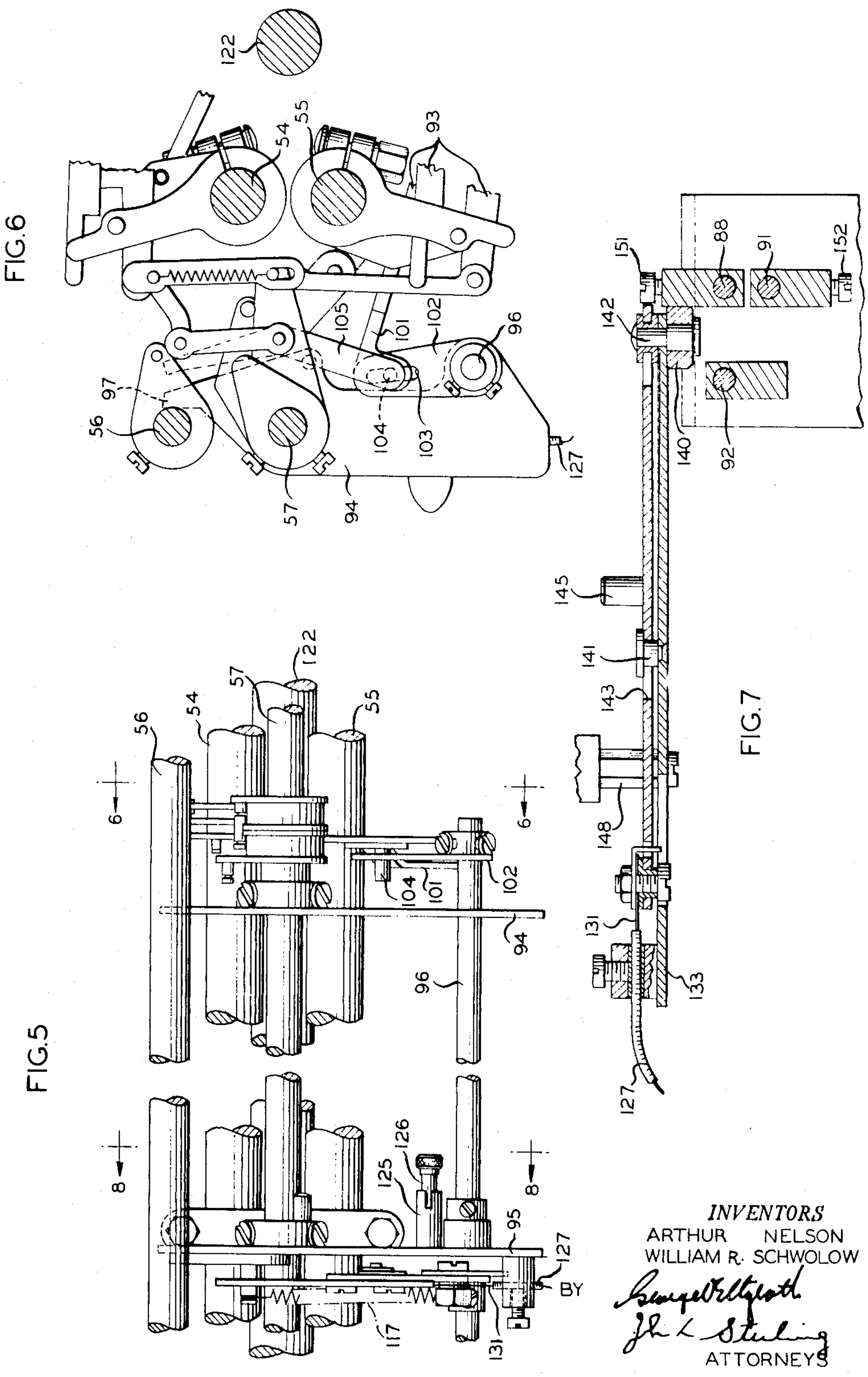
Fig. 5 is a fragmentary view in front elevation of the machine head section with many parts omitted or broken away, and showing the invention applied thereto.
Fig. 6 is a vertical section on the line 6—6 of Fig. 5 showing a portion of the multiplication control mechanism in side elevation.
Fig. 7 is a horizontal section on the line 7—7 of Fig. 9 showing a holding member in retracted position.

The opposite end of the Bowden wire housing 127, see Figs. 9 and 7, is mounted in a block 132 attached to a plate 133. The corresponding end of the Bowden wire core 131 is suitably secured to a holding member 136.

The holding member 136 is mounted on the plate 133 by means of the shoulder rivets 141 and 142 or other suitable means for permitting motion of said holding member within limits imposed by slots 143 and 144, respectively. A roller 140 mounted on one end of the shoulder rivet 142 helps to support the control rod 88 (or 91) during vertical motion of said rod. Said holding member is operable to an extended and to a retracted position. Construction is such that said holding member will be extended whenever said rockable lever 107 is urged to its active position by action of said spring 117, and will be retracted whenever said rockable lever is urged to its inactive position by engagement of said hook-like member with said cylically-operated lever 114.

A pin 145, mounted on the holding member 136, provides means for maintaining said holding member in retracted position, as will be described hereinafter.

A post 146 is mounted at a suitable location in a casting 147 secured to the base 25 of the machine. The plate 133 is mounted to the upper end of the post 146 and is separated therefrom by means of the spacers 148. By using spacers of two different lengths, the plate 133 may be positioned so that the holding member 136, when extended, will engage either a screw 151 of the control rod 88 or a screw 152 of the control rod 91. For purpose of description only the short spacers are shown so that the holding member 136, when extended, will engage the screw 151 of the control rod 88. (The rod 88 corresponds to the rod 113 as shown in Patent 2,516,013.) It will be understood that said control rod is depressed upon sensing of a proper control hole in field 2 of a record card, providing that its related interponent 87 is set active and that the machine is conditioned for selective sensing by setting the lever 73 active, whereupon field 3 is preselected for the next cycle of machine operation. (The control rod 91 corresponds to the rod 113B shown in Patent 2,516,013.) It will be understood that said control rod is depressed upon sensing of a proper control hole in field 2 or 3 of a record card, providing that its related interponent 87 is set active and that the machine is conditioned for selective sensing by setting the lever 73 active, whereupon field 4 is preselected for the next cycle of machine operation.

(The member 73 corresponds to member 185 of Patent 2,516,013 and the control rod 92 corresponds to the rod 177 of the referenced patent.) It will be understood that said control rod 92 is depressed upon sensing of a proper control hole in field 2 or 3 of a record card, with the machine conditioned for successive sensing operations, whereupon the card presently in the card chamber is ejected and a new card is fed in. This action is independent of that obtained by means of the control rod 88 or the control rod 91. Operation of the rods 88, 91 and 92 is fully described in the above cited patent, 2,516,013.

A plate 153 is secured to the side of the wiring unit 38 at a location such that the arm 154 of a bellcrank 155 mounted thereon is engageable with the pin 145 fast on the holding member 136. The arm 156 of the bell crank 155 has an ear 157 formed off therefrom, said ear being adapted for operation by a Bowden wire 158 having a core 161. A control perforation D is punched at a desired position in the record card and the set pin 36 for said position is wired to the ear 157. The bellcrank 155 is operable to an inactive and to an active position. The construction is such that said bellcrank is urged to its normal inactive position by action of a spring 162. When inactive, the arm 156 of the bellcrank 155 does not protrude into the path of the pin 145. Upon sensing of a control hole D, the Bowden wire core 161 depresses the arm 156 thus rocking the bellcrank 155 to its active position. When active, the arm 154 of the bellcrank 155 bears against the pin 145 of the holding member 136, thus maintaining said holding member in retracted position. In this manner, the multiplier mechanism is capable of being disabled under card control.

As heretofore mentioned, it is assumed that the post 146 is positioned so that the holding member 136 is engageable with the rod 88. In this configuration, the machine is conditioned to sense field 3 immediately following field 2 by punching control perforation A in a desired position in field 2 (see Fig. 2) wiring the set pins 36 for this position to the related plunger 85.

The multiplier is punched in field 2 of the record card as a subtraction item, and is wired to enter the control totalizer starting with the tens wheel.

The multiplicand is punched in field 3 of the record card and is wired to enter a separate totalizer other than the control totalizer. This totalizer may be either straight adding or direct subtraction as the mulitplicand will always be added.

The constant amount of one (1) is punched by perforation 166 in field 3 of the record card as an add item and is wired to enter the tens wheel of the control totalizer.

The manually-operated pin 126 is set out in its short slot to enable the multiplying attachment.

The control bars 62 for the type bars 44 associated with the control totalizer 93 will have the connector 64 set effective to engage the blade of the shaft 66 when said shaft is rocked counterclockwise. This will prevent clearing the control totalizer of the control amount, insertion of which is described hereinafter. Also, the connector 63 of the control bars 62 associated with the control totalizer 93 is set effective, by means of the detent 68, to engage the slam bail shaft 71 when said shaft is rocked counterclockwise. The remaining control bars 62 in use will be set as for Totals Only operation, as described in Patent 2,323,816.

The machine will now be cleared by initiating a total operation. Subsequently a record card is punched with the amount of five (5) in the column corresponding to the units wheel of the control totalizer, and with the amount of two (2) in the column corresponding to the tens wheel of the control totalizer. This card will now be fed into the machine so as to enter the proper control amount in the control totalizer. This amount may be thought of as being two and five tenths (2.5) and is to be retained in the totalizer until all multiplication operations have been completed.

It will be understood that the credit balance link 101 will indicate a positive amount in said control totalizer at this time and will therefore hold the shaft 96 rocked in a clockwise direction by means of the arm 102 as seen in Fig. 6. Such action will rock the arm 106 clockwise as seen in Fig. 8, and will rock the hook-like member to active position. Since the lever 114 is actuated once during each machine cycle, it will be apparent that the holding member will move from extended to retracted position at a certain time during each machine cycle, unless otherwise prevented.

Conversely, whenever a negative amount is present in said control totalizer, said credit balance link 101 will hold the shaft 96 rocked in a counterclockwise direction. Such action will rock said hook-like member to its inactive position. That is, the lever 114 will move in idle motion and the holding member 136 will be urged toward its extended position by the spring 117.

For purpose of example, it is assumed that a record card having designative data such as Number 368 indicated by perforations 163 punched in field 1, a multiplier of the quantity four (4) together with credit symbol (C) indicated by perforations 164 punched in field 2 as a subtraction item, a control perforation A in field 2, a multiplicand of the quantity twenty-two (22) indicated by perforations 165 punched in field 3, and the constant amount of one (1) indicated by perforation 166 punched in field 3 as an add item (Fig. 2), is fed into the card chamber.

Inasmuch as the machine is at this time conditioned for first stage operation, fields 1 and 2 are sensed near the end of a machine cycle.

Action is obtained on first stage operation (next machine cycle) as follows: designative data peculiar to the card group is sensed in field 1; control perforation A of field 2 initiates proper action to depress the rod 88 so as to preselect field 3 to be sensed on second stage operation; and the multiplier sensed in field 2 is entered in the control totalizer as a subtraction item.

A multiplier quantity greater than two (2) has been selected. It is apparent that insertion of such an amount as a subtraction item will cause the control totalizer 93 to pass from a positive condition to a negative condition, at which time the credit balance link 101 moves to a position indicative of a negative amount in said totalizer. Such movement of the credit balance link 101 results in a counterclockwise rotation of the arm 102. Resulting counterclockwise motion of the shaft 96 and attached arm 106 rocks said hook-like member to its inactive position. The spring 117 urges the rockable lever 107 to its active position, thereby applying force to the Bowden wire 131 to extend the holding member 136.

When extended, said holding member will bear against the screw 151 and will act to hold the control rod 88 in its actuated (depressed) position. (See Fig. 10.) The machine is held conditioned in this manner for continuous sensing of fields 1 and 3 (second stage operation).

Action is obtained on the first machine cycle of second stage operation as follows: the multiplicand is entered into its proper totalizer as a positive amount; the quantity of one (1) is entered into the control totalizer as a positive amount. This operation continues on succeeding machine cycles until the control totalizer passes from the negative condition to the positive condition. This point is indicated by the asterisk on Fig. 4. It will be realized that this point is reached whenever the number of repetitive machine cycles is two less than the numerical quantity of the multiplier, by reason that the control totalizer initially registered the amount of 2.5 positive.

At the time that the control totalizer balance reverts to a positive condition, the credit balance link 101 moves to the position indicating this condition. Such action imparts clockwise motion to the arm 102 with resulting clockwise motion of the shaft 96 and the arm 106. Clockwise motion of the arm 106 applies force through the link 115 to rock said hook-like member to its active position. At a certain time during the machine cycle then in progress, the lever 114 is actuated by means described hereinbefore. The pin 113 cooperates with said hook-like member to urge the rockable lever 107 to its inactive position, thereby applying force to the Bowden wire 131 to retract the holding member 136. The control rod 88 thereupon is permitted to return to its nonactuated position.

The machine will complete the machine cycle then in progress and so will enter the multiplicand and the quantity of one (1) into their respective totalizers. Since normal operation of the multi-stage mechanism obtains one additional machine cycle after restoration of the control rod 88 to its non-actuated position, the multiplicand and the quantity of one (1) again enter their respective totalizers during the next machine cycle. The number of machine cycles obtained during second stage operation is now equal to the numerical quantity of the multiplier, and the control totalizer now registers the original control amount of 2.5 positive. Illustration of machine tabulation for the cited multiplication operation is shown in Fig. 4.

Early in the last machine cycle of the multiplication operation, normal operation of the multi-stage mechanism opens the card stop 39 to feed out the present card and enables the card feed mechanism so that the picker 28 can feed in a new card. This action is obtained by restoration of the control rod 88 and is described in the Patent 2,516,013.

Operation of the multiplying attachment as described in the foregoing material will necessitate grouping of all cards having multiplication operations. The multiplication mechanism is enabled at the start of the group by withdrawing the manually-operated pin 126 and is disabled at the end of the group by lifting the rockable lever 107 and inserting said manually-operated pin.

Suitable means are provided in the multiplication mechanism to permit disabling of the multiplying mechanism under card control. Cards controlling multiplying operations are punched as described hereinbefore and may be intermixed with cards that do not require such operations. Each card that does not require multiplication will be punched with a control hole D (see Fig. 2), at a suitable location. For purpose of description, it is assumed that a multiplication card has been fed out of the sensing chamber 31 and that a new card requiring tabulation only has been fed in. The machine is conditioned for first stage operation according to normal function of the multi-stage mechanism and fields 1 and 2 are sensed near the end of the last machine cycle of the multiplication operation. The control performation D initiates proper action to depress the core 161 of the Bowden wire 158. This action causes the arm 156 to bear against the pin 145 and therefore maintains the holding member 136 in retracted position. In this manner the multiplying means are rendered ineffective. This action will be repeated for each card having a control perforation D. For card groups that do not require multiplication, it is desirable to disable the multiplying means manually by lifting the rockable lever 107 and inserting the manually-operated pin 126.

Normal operation of the multi-stage mechanism with multiplying mechanism utilizes but two stages of successive sensing operation to perform multiplication. Upon completion of second stage operation, then, the machine is conditioned automatically to obtain first stage operation on the next card. Accordingly, when the new card is fed into the sensing chamber 31, near the midpoint of the last machine cycle of second stage operation, fields 1 and 2 of the new card will be sensed near the end of this machine cycle.

Designative data punched in field 1 of the new card will differ from that in the same area of the preceding card. The designation pattern previously set up on the set pins 36 will be erased and the new pattern will actuate the slides 84 to cause a sub-total operation of the machine. As described in Patent 2,381,361, the card feed mechanism is disabled and the card stop is maintained closed for the two machine cycles required for the sub-total operation. During the second machine cycle of the sub-total operation, the machine will print the multiplication result. Upon completion of the sub-total operation, the machine will revert to first-stage operation on the new card as described hereinbefore.

The grand total of several multiplication results may be obtained by providing a change of grand total designative data.

Whereas it has been described that the mechanism senses fields 2 and 3, in the succession named, it can sense fields 2 and 4 in that succession by mounting the plate 133 so that the holding member 136, when extended, will engage the screw 152 of the rod 91; by punching the appropriate control hole in the second position mentioned to be in field 2; and by appropriately wiring said position to the corresponding plunger 85.

By providing more than one multiplicand in field 3 (or 4) of the card and by wiring each such multiplicand to its respective totalizer, it is apparent that multiplication of the various multiplicands by the single multiplier will be accomplished simultaneously.

Whereas it has been described that the multiplicand may be punched in field 3 of the record card, it will be realized that said multiplicand may be punched in field 1 and this value withheld on first stage operation by means of a suitable naught block control, as described in Patent 2,381,361.

Whereas it has been described that all necessary information to perform a multiplication operation is contained on one record card, it will be realized that the designative data peculiar to the operation and the multiplier may be punched in one record card, and identical designative data, the multiplicand(s) and the quantity one (1) may be punched in the next card following. This configuration will reqiure that a proper field selection control hole A or B be punched in field 2 of the first (multiplier) card to condition the machine for sensing field 3 (or 4) on second stage operation which will be on the card following. Also, a control hole C (see Fig. 2) must be punched in field 2 of the first card so as to actuate the rod 92 on first stage operation. This will permit the first card to feed out and the second card to feed in during first stage operation.

It will be realized that the control holes A, B, C, and D, shown as dotted lines in Fig. 2, are presented for variance. Control hole locations are determined according to specific circumstances.

While we have described what we consider to be a highly desirable embodiment of our invention it is obvious that many changes in form could be made without departing from the spirit of our invention, and we, therefore, do not limit ourselves to the exact form herein shown and described nor to anything less than the whole of our invention as hereinbefore set forth, and as hereinafter claimed.

What we claim as new, and desire to secure by Letters Patent, is:

1. In a machine of the class described having means for sensing different areas or fields of a record card on successive sensing operations, means for accumulating data sensed in said fields, and total taking means operative upon completion of said successive sensing operations, means operated by the totalizer associated with one of said fields for controlling the number of successive sensing operations of another of said fields, card-controlled means for disabling said totalizer operated means, and manually-operated means for disabiling said totalizer operated means on all sensing operations.

2. In a machine of the class described having means for sensing different areas or fields of a record card on successive sensing operations, means for accumulating data sensed in said fields, and total taking means operative upon completion of said successive sensing operations, means, operated by the totalizer associated with one of said fields for controlling the number of successive sensing operations of another of said fields, and card-controlled means for disabling said totalizer operated means.

3. In a machine of the class described having means for sensing different areas or fields of a record card on successive sensing operations, a plurality of totalizers arranged to record respective amounts sensed in said fields, and total taking means operative upon completion of said successive sensing operations, means controlled by the totalizer associated with the field first sensed and responsive to a change in the sign condition thereof for limiting the recording of values from the field next sensed to a number of machine cycles determined by a value recorded from said field first sensed.

4. In a machine of the class described having means for sensing different areas or fields of a record card on successive sensing operations, a plurality of totalizers arranged to record respective amounts sensed in said fields including one totalizer associated with the field first sensed and one or more other totalizers associated with the field next sensed, and total taking means operative upon completion of said successive sensing operations, means controlled by said one totalizer associated with the field first sensed and responsive to a change in the sign condition thereof for determining the number of successive sensing operations of the field next sensed for accumulation of successively sensed amounts in said other totalizers.

5. In a machine of the class described having means for sensing different areas or fields of a record card on successive sensing operations including control members actuated selectively under card control to disable the field first sensed and to enable the field next sensed, a plurality of totalizers one of which is associated with said field first sensed and is preconditioned to register an arbitrary amount, one or more other totalizers associated with said field next sensed, and total taking means operative upon completion of said successive sensing operations, means controlled by said one totalizer for multiplying amounts sensed in said fields and including a holding member, said holding member acting when extended to retain a preselected one of said control members in actuated position for a number of successive sensing operations of said field next sensed determined by an amount sensed in said field first sensed, card-controlled means operative during each successive sensing of said field next sensed for reducing the amount registered in said one totalizer by a predetermined amount, said predetermined amount being opposite in sign to said amount registered in said one totalizer.

6. In a machine of the class described having means for sensing different areas or fields of a record card on successive sensing operations, a plurality of totalizers arranged to record respective amounts sensed in said fields, one of said totalizers associated with the field first sensed being preconditioned to register an arbitrary amount of predetermined sign, means for recording an amount of opposite sign in the said one totalizer from the field first sensed, means for recording a constant amount of said predetermined sign from the field next sensed in said one totalizer on each sensing operation of the field next sensed, means for determining the number of sensing operations of the field next sensed, said means limiting the sensing operations to a number required to return said one totalizer to its arbitrary amount of predetermined sign.

7. In a machine of the class described having means for sensing different areas or fields of a record card on successive sensing operations including control members actuated selectively under card control to disable the field first sensed and to enable the field next sensed, a plurality of totalizers one of which is associated with said field first sensed and registers an amount of one condition from said field first sensed, one or more other totalizers associated with said field next sensed, and total taking means operative upon completion of said successive sensing operations, a holding member operable to an extended and to a retracted position and when extended maintaining a preselected one of said control members in actuated position for repeated sensing of said field next sensed, card-controlled means operative during each successive sensing of said field next sensed for registering a predetermined amount in said one totalizer, said predetermined amount being opposite in sign to the first-mentioned amount registered in said one totalizer, and means controlled by said one totalizer for selectively operating said holding member.

8. In a machine of the class described having means for sensing different areas or fields of a record card on successive sensing operations including control members actuated selectively under card control to disable the field first sensed and to enable the field next sensed, a plurality of totalizers one of which is associated with said fields first and next sensed and registers an amount of one condition from said field first sensed and an amount of opposite condition from a portion of the field next sensed, one or more other totalizers associated with another portion of said field next sensed, and total taking means operative upon completion of said successive sensing operations, multiplying means comprising a holding member extendable to engage a preselected one of said control members for repeated sensing of said field next sensed and retractable to release said one control member, and means controlled by said one totalizer for extending and retracting said holding member in accordance with the sign condition of said totalizer resulting from the amounts successively registered therein from said fields first and next sensed.

9. In a machine of the class described having means for sensing different areas or fields of a record card on successive sensing operations including control members actuated selectively under card control to disable the field first sensed and to enable the field next sensed, a plurality of totalizers one of which is associated with said fields first and next sensed and registers an amount of one condition from said field first sensed and an amount of opposite sign condition from a portion of the field next sensed, one or more other totalizers associated with another portion of said field next sensed, and total taking means operative upon completion of said successive sensing operations, multiplying means comprising a lever operatively associated with a preselected one of said control members and rockable from inactive to active position to maintain said preselected one of said control members in actuated position, and means associated with said one totalizer for rocking said rockable lever to an active position or to an inactive position in accordance with the sign condition of said totalizer resulting from the amounts successively registered therein from said fields first and next sensed.

10. In a machine of the class described having means for sensing different areas or fields of a record card on successive sensing operations including control members actuated selectively under card control to disable the field first sensed and to enable the field next sensed, a plurality of totalizers one of which is associated with said fields first and next sensed and registers an amount of one condition from said field first sensed and an amount of opposite condition from a portion of the field next sensed, one or more other totalizers associated with another portion of said field next sensed, and total taking means operative upon completion of said successive sensing operations, multiplying means comprising a hook-like member operatively associated with a preselected one of said control members and rockable from inactive to active position for returning a preselected one of said control members to its unactuated position, and means associated with said one totalizer for rocking said hook-like member to active or to inactive position in accordance with the sign condition of said totalizer resulting from the amounts successively registered therein from said fields first and next sensed.

11. In a machine of the class described having means for sensing different areas or fields of a record card on successive sensing operations including control members actuated selectively under card control to disable the field first sensed and to enable the field next sensed, a plurality of totalizers one of which is associated with said fields first and next sensed and registers an amount of one condition from said field first sensed and an amount of opposite sign condition from a portion of the field next sensed, one or more other totalizers associated with another portion of said field next sensed, and total taking means operative upon completion of said successive sensing operations, multiplying means comprising a rockable lever operatively connected to a holding member and operable from inactive to active position for extending said holding member, said holding member when extended being engageable with a preselected one of said control members, and means associated with said one totalizer for rocking said rockable lever to active or to inactive position in accordance with the sign condition of said totalizer resulting from the amounts successively registered therein from said fields first and next sensed.

12. In a machine of the class described having means for sensing different areas or fields of a record card on successive sensing operations including control members actuated selectively under card control to disable the field first sensed and to enable the field next sensed, a plurality of totalizers one of which is associated with said fields first and next sensed and registers an amount of one condition from said field first sensed and an amount of opposite sign condition from a portion of the field next sensed, one or more other totalizers associated with another portion of said field next sensed, and total taking means operative upon completion of said successive sensing operations, multiplying means comprising a hook-like member operatively connected to a holding member and operable from active to inactive position for extending said holding member, said holding member when extended being engageable with a preselected one of said control members, and means associated with said one totalizer for selective operation of said hook-like member to active and to inactive position in accordance with the sign condition of said totalizer resulting from the amounts successively registered therein from said fields first and next sensed.

13. In a machine of the class described having means for sensing different areas or fields of a record card on successive sensing operations including control members actuated selectively under card control to disable the field first sensed and to enable the field next sensed, a plurality of totalizers one of which is associated with said fields first and next sensed and registers an amount of one condition from said field first sensed and an amount of opposite sign condition from a portion of the field next sensed, one or more other totalizers associated with another portion of said field next sensed, and total taking means operative upon completion of said successive sensing operations, multiplying means comprising a hook-like member operatively engageable at certain times with a cyclically-operated lever and operable by said lever from inactive to active position for returning a preselected one of said control members to nonactuated position, and means associated with said one totalizer for engaging and disengaging said hook-like member in accordance with the sign condition of said totalizer resulting from the amounts successively registered therein from said fields first and next sensed.

14. In a machine of the class described having means for sensing different areas or fields in each of two record cards on successive sensing operations, means for accumulating data sensed in said fields, and total taking means operative upon completion of said successive sensing operations, means controlled by the totalizer associated with the field sensed on the first of said record cards for recording values in the field sensed on the second of said record cards for a number of machine cycles determined by a value recorded in the field sensed in said first card, card-controlled means for disabling said totalizer controlled means, and manually-operated means for disabling said totalizer controlled means on all sensing operations.

15. In a machine of the class described having means for sensing different areas or fields in each of two record cards on successive sensing operations including control members actuated selectively under card control to disable the field sensed on the first of said record cards and to enable the field sensed on the second of said record cards and having another control member actuated under card control to feed out said first card after sensing, a plurality of totalizers including one associated with the field sensed in said first card and one or more totalizers associated with the field sensed in said second card, and total taking means for totalizers associated with said second card operative upon completion of said successive sensing operation, card-controlled means for engaging and holding a preselected one of said control members in actuated position for sensing the effective field of said second card for a number of successive sensing operations determined by an amount sensed in the effective field of said first card, and means controlled by said one totalizer for releasing said control member upon completion of said successive sensing operations.

16. In a machine of the class described having means for sensing different areas or fields in each of two record cards on successive sensing operations including control members actuated selectively under card control to disable the field sensed on the first of said record cards and to enable the field sensed on the second of said record cards and having another control member actuated under card control to feed out said first card after sensing, a plurality of totalizers including one associated with the field sensed in said first card, one or more totalizers associated with the field sensed in said second card, and total taking means for said totalizers associated with said second card operative upon completion of said successive sensing operations, multiplying means controlled by said one totalizer and including a holding member, said holding member acting when extended to retain a preselected one of said control members in actuated position for a number of successive sensing operations of the effective field of said second card determined by an amount sensed in the effective field of said first card, and card-controlled means operative during each successive sensing of the effective field of said second card for reducing said amount registered in said one totalizer by a predetermined amount, said predetermined amount being opposite in sign to said amount registered in said one totalizer.

17. In a machine of the class described having means for sensing different areas or fields in each of two record cards on successive sensing operations including control members actuated selectively under card control to disable the field sensed on the first of said record cards and to enable the field sensed on the second of said record cards and having another control member actuated under card control to feed out said first card after sensing, a plurality of totalizers including one associated with the field sensed in said first card, one or more totalizers associated with the field sensed in said second card, and total taking means for totalizers associated with said second card operative upon completion of said successive sensing operations, multiplying means controlled by said one totalizer and including a holding member, said holding member acting when extended to retain a preselected one of said control members in actuated position for a number of successive sensing operations of the effective field of said second card determined by an amount sensed in the effective field of said first card, and card-controlled means operative during each successive sensing of the effective field or said second card for reducing said amount registered in said one totalizer by a predetermined amount, said predetermined amount being opposite in sign to said amount registered in said one totalizer.

References Cited in the file of this patent

UNITED STATES PATENTS 2,079,429 Tauschek ------------- May 4, 1937